United States Patent Office.

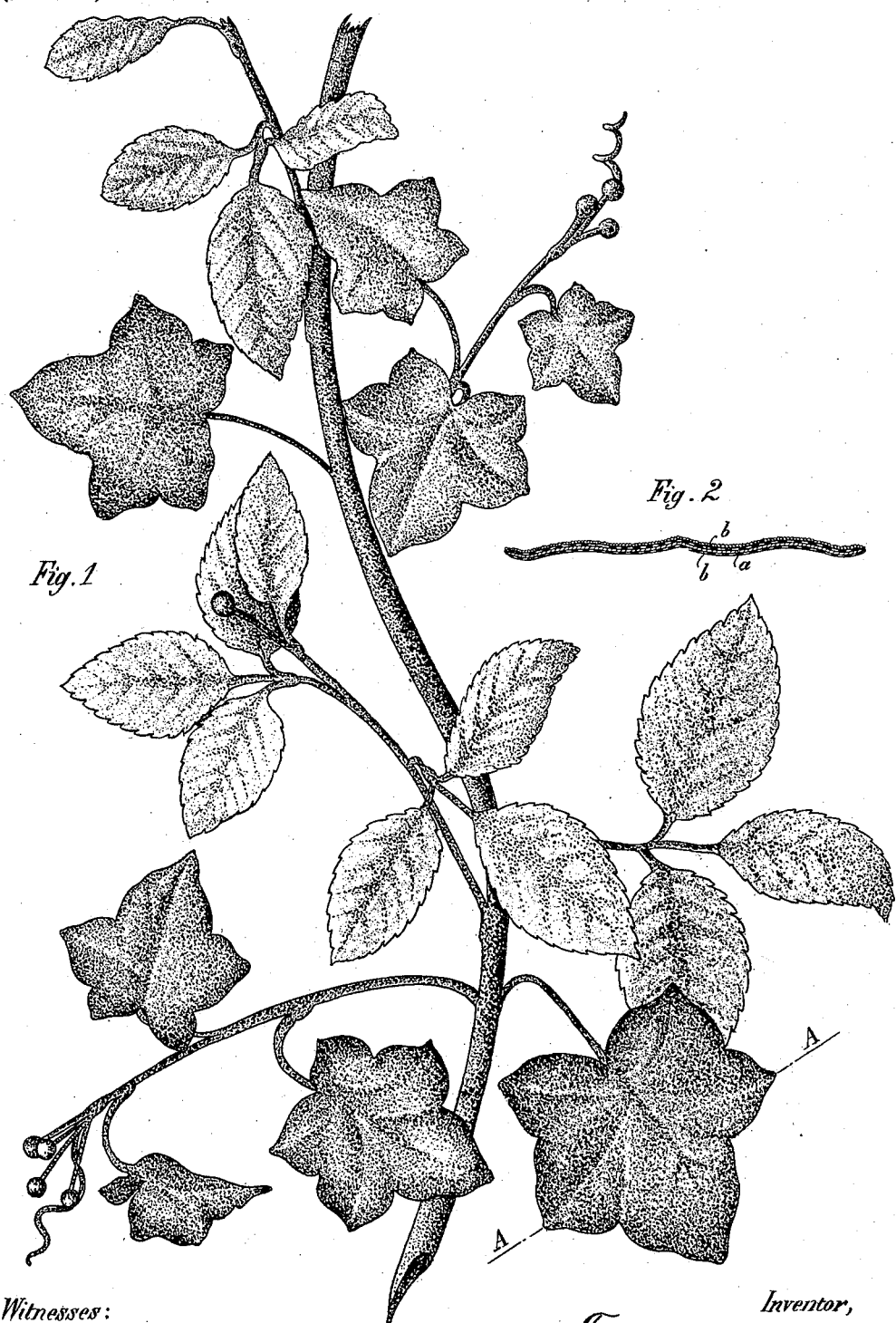

FERDINAND KRUEL, OF KAISERSLAUTERN, GERMANY.

METALLIC ARTIFICIAL FLOWER.

SPECIFICATION forming part of Letters Patent No. 687,245, dated November 26, 1901.

Application filed February 4, 1901. Serial No. 45,875. (No specimens.)

*To all whom it may concern:*

Be it known that I, FERDINAND KRUEL, a subject of the King of Bavaria, residing at 37 Barbarossastrasse, in the city of Kaiserslautern, Rhenish Palatinate, Kingdom of Bavaria, German Empire, have invented an Improvement in Metallic Artificial Flowers, of which the following is a specification.

This invention has reference to a process for producing a glistening velvet-like or hoary coating upon the surface of artificial leaves, flowers, and plants, which may be made of any suitable material, the process being equally adapted to single plants as well as to combinations of those in the form of wreaths, bunches, and the like.

Flowers such as pansies, deep-red-colored roses, ice-flowers, lilacs, and the like, or fruit like peaches, plums, and the like, which show a velvet-like appearance, may be reproduced by my process with all the effects of nature. While before my invention it was only possible to imitate the natural colors upon artificial flowers, yet the soft velvet-like coating which causes the peculiar charm of the living flower it was impossible to even approach by the most delicate painting. I am aware that it has been attempted to produce the velvet-like appearance by spreading potato-flour upon the surface; but this method is defective, inasmuch as it destroyed the vividness of the underlying color on account of the opaqueness of the flour.

In the accompanying drawings, Figure 1 is a face view of an artificial flower embodying my invention, and Fig. 2 is a cross-section of the same.

In carrying my invention into effect I proceed as follows: The artificial flowers, fruit, leaves, and the like, which are stamped from sheet metal to form a base $a$ of a curved form, are first painted upon their exhibiting-surfaces in the natural colors. They are then given a coating of some transparent varnish, and while the varnish is still liquid the surface is dusted over with very minute transparent glass beads $b$, which after the varnish has become dry will adhere to the surface paint of the artificial flowers and the like. The combined effects of the said beads and of the underlying vivid coloration will produce the above-mentioned impression of natural plants.

It is an esssential advantage of my invention as compared with artificial plants of this kind produced before my invention that the material thus coated will stand washing off, and may thus be easily cleaned and brightened up. Flowers made according to my invention are therefore perfectly proof against atmospheric influences, a point of great consequence in the manufacture of wreaths, festoons, and the like which are exposed to the influence of the weather. The novel effect consists in the refraction of the light by the delicate glass beads and the consequent production of decorative effects, imitating those of the natural objects and increased and "etherealized," so to speak, by the novel effects of light. It may also be mentioned that the coating thus produced upon the surface of artificial plants and the like makes a far more natural impression than it would produce if spread upon a flat surface, inasmuch as the shades obtained by the corporeal appearance of the flowers, leaves, and the like add to the other effects of the colors and result in a very harmonious and natural impression.

What I claim, and desire to secure by Letters Patent of the United States, is—

The process of producing artificial flowers which consists in stamping sheet metal to form a curved base having the outline of the flower desired, painting said base, then varnishing it, and then spreading a coat of very small transparent beads upon it before the varnish has set, substantially as specified.

In witness whereof I have hereunto signed my name in the presence of two subscribing witnesses.

FERDINAND KRUEL.

Witnesses:
　CARL IHRIG,
　JAC. WINTEROLT.